(12) United States Patent
Richard et al.

(10) Patent No.: US 10,058,028 B2
(45) Date of Patent: *Aug. 28, 2018

(54) MODULAR CROP DIVIDER AND BASE CUTTER ARRANGEMENT FOR SUGARCANE HARVESTERS

(71) Applicant: Deere & Company, Moline, IL (US)

(72) Inventors: Eric P. Richard, Thibodaux, LA (US); Michael L. Halbrook, Thibodaux, LA (US); Daniel J. Corbett, Thibodaux, LA (US); John P. Scrivner, Thibodaux, LA (US); Kerry J. Morvant, Thibodaux, LA (US); Marlin L. Goodnight, Thibodaux, LA (US); Dusk S. Mixon, Saint Amant, LA (US)

(73) Assignee: DEERE & COMPANY, Moline, IL (US)

(*) Notice: Subject to any disclaimer, the term of this patent is extended or adjusted under 35 U.S.C. 154(b) by 13 days.

This patent is subject to a terminal disclaimer.

(21) Appl. No.: 15/344,020

(22) Filed: Nov. 4, 2016

(65) Prior Publication Data

US 2017/0049046 A1     Feb. 23, 2017

Related U.S. Application Data

(62) Division of application No. 14/670,230, filed on Mar. 26, 2015, now Pat. No. 9,516,813.

(60) Provisional application No. 62/012,100, filed on Jun. 13, 2014.

(51) Int. Cl.
*A01D 34/00* (2006.01)
*A01D 34/66* (2006.01)
*A01D 45/10* (2006.01)
*A01D 63/04* (2006.01)

(52) U.S. Cl.
CPC ........... *A01D 34/664* (2013.01); *A01D 45/10* (2013.01); *A01D 63/04* (2013.01)

(58) Field of Classification Search
CPC ...... A01D 46/081; A01D 45/10; A01D 63/02; A01D 67/005; A01D 63/04; B60G 2206/60; B60G 2206/604; B60G 2206/601; B60G 2300/08
USPC .............................................. 56/15.5, 10.2 F
See application file for complete search history.

(56) References Cited

U.S. PATENT DOCUMENTS

| | | | |
|---|---|---|---|
| 3,785,130 A | 1/1974 | Gaeddert | |
| 4,237,681 A * | 12/1980 | Zantzinger, Jr. | ....... A01D 45/16 56/13.6 |
| 4,249,365 A | 2/1981 | Hubbard | |
| 4,470,244 A | 9/1984 | Leigers | |
| 4,803,830 A | 2/1989 | Junge | |
| 4,896,492 A | 1/1990 | Junge | |
| 5,782,072 A | 7/1998 | Matthews | |
| 6,076,340 A * | 6/2000 | Fowler | ................... A01D 45/10 56/13.3 |
| 6,079,192 A | 6/2000 | Rasmussen | |

(Continued)

*Primary Examiner* — Arpad Fabian-Kovacs
(74) *Attorney, Agent, or Firm* — Klintworth & Rozenblat IP LLP; Steven J. Wietrzny

(57) ABSTRACT

A sugarcane harvester may include a chassis with various discreet and laterally separated mounting locations. Crop divider support modules may be configured to separately and fixedly attach to the chassis at various of the mounting locations, in order to support respective crop dividers in a variety of discreet and laterally separated orientations.

9 Claims, 6 Drawing Sheets

(56) References Cited

U.S. PATENT DOCUMENTS

| | | | |
|---|---|---|---|
| 6,745,550 B1 * | 6/2004 | Hinds | A01D 45/10 56/13.3 |
| 8,028,506 B1 | 10/2011 | Casper | |
| 9,516,813 B2 * | 12/2016 | Richard | A01D 45/10 |
| 2002/0174640 A1 * | 11/2002 | Fox | A01D 46/16 56/28 |
| 2010/0307121 A1 * | 12/2010 | Marchini | A01D 45/10 56/63 |
| 2015/0327437 A1 * | 11/2015 | Mixon | B02C 18/06 56/16.4 C |

* cited by examiner

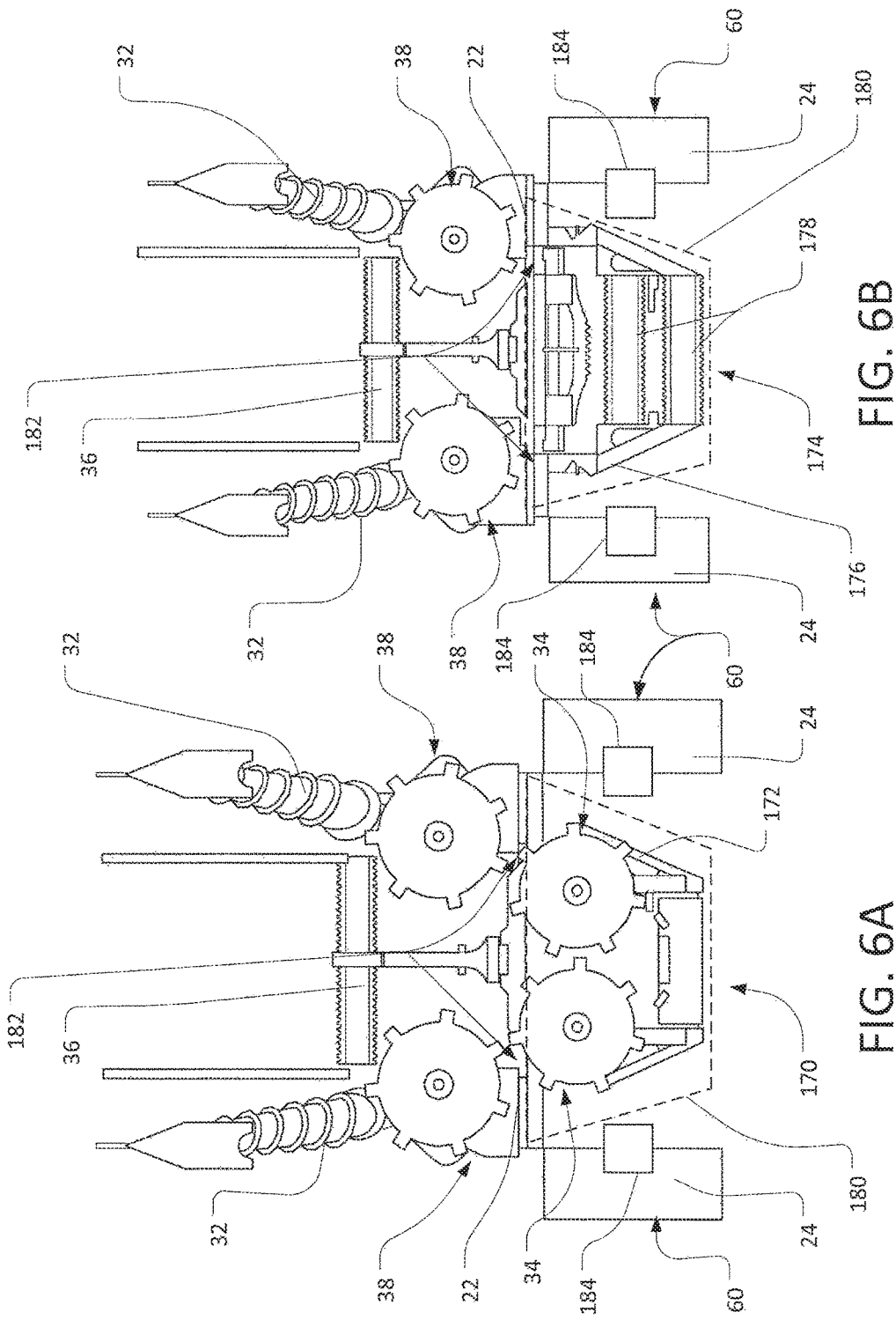

MODULAR CROP DIVIDER AND BASE CUTTER ARRANGEMENT FOR SUGARCANE HARVESTERS

CROSS-REFERENCE TO RELATED APPLICATION(S)

This is a divisional application of U.S. Utility application Ser. No. 14/670,230, filed Mar. 26, 2015, which claims the benefit of U.S. Provisional Application No. 62/012,100 filed Jun. 13, 2014, the disclosures of which are incorporated herein by reference.

STATEMENT OF FEDERALLY SPONSORED RESEARCH OR DEVELOPMENT

Not applicable.

FIELD OF THE DISCLOSURE

This disclosure relates to sugarcane harvesters, including modular configurations for sugarcane harvesters.

BACKGROUND OF THE DISCLOSURE

Harvesters of various types, including sugarcane harvesters, may include harvesting devices of various types. Harvesting devices for a sugarcane harvester, for example, may include assemblies for cutting, chopping, sorting, transporting, and otherwise gathering and processing sugarcane plants. Typical harvesting devices include base cutter assemblies (or "base cutters"), feed rollers, cutting drums, and so on. In various harvesters, harvesting devices may be hydraulically powered by an engine-driven (or other) pump.

To actively harvest crops, a harvester may move along a field with harvesting devices engaged, the harvesting devices gathering and processing material from rows of crop plants. In the case of sugarcane harvesters, gathered sugarcane stalks may be chopped into billets for delivery to a trailing wagon, while leaves and trash may be separated from the billets and ejected into the field.

Sugarcane may be planted in a variety of arrangements, including in fields with raised rows, flat rows, rows with various spacings, and so on. As such, a configuration of harvesting devices that is useful for harvesting a particular field may not be optimal for harvesting a different field. For example, in fields with one particular row spacing, a particular width between crop dividers may be utilized to appropriately direct sugarcane into the harvester. In fields with a different row spacing, however, a different width between crop dividers may be more effective. Similarly, a particular combination and orientation of various base cutters (or other harvesting devices) may be particularly suitable to specific field arrangements and sugarcane characteristics. A different combination and orientation, however, may be more effective in other circumstances.

SUMMARY OF THE DISCLOSURE

A modular assembly is disclosed for monitoring various operating modes of a harvester. According to one aspect of the disclosure, a sugarcane harvester may include a chassis with various discreet and laterally separated mounting locations. Crop divider support modules may be configured to separately and fixedly attach to the chassis at various of the mounting locations, in order to support respective crop dividers in a variety of discreet and laterally separated orientations.

In certain embodiments, base cutter support modules may be configured to separately and fixedly attach to the chassis at various mounting locations, in order to support respective base cutters in a variety of discreet and laterally separated orientations. The base cutter support modules may be attached to the chassis at common mounting locations with the crop divider support modules.

In certain embodiments, various actuators may be provided. Certain actuators, for example, may be configured to move base cutter assemblies with respect to associated base cutter support modules, to move crop dividers with respect to associated crop divider support modules, or to move various support modules between different mounting locations.

In certain embodiments, the chassis may include a module cavity. A feed roller support module and a rear base cutter support module may be separately mounted within the module cavity. The feed roller support module may be configured to support feed rollers within the module cavity when mounted to the chassis. The rear base cutter support module may be configured to support rear base cutters within the module cavity when mounted to the chassis.

The details of one or more implementations are set forth in the accompanying drawings and the description below. Other features and advantages will become apparent from the description, the drawings, and the claims.

BRIEF DESCRIPTION OF THE DRAWINGS

FIGS. 6A and 6B are partial top views of the harvester of FIG. 1, including a module cavity.

Like reference symbols in the various drawings indicate like elements.

DETAILED DESCRIPTION

Figure 1:
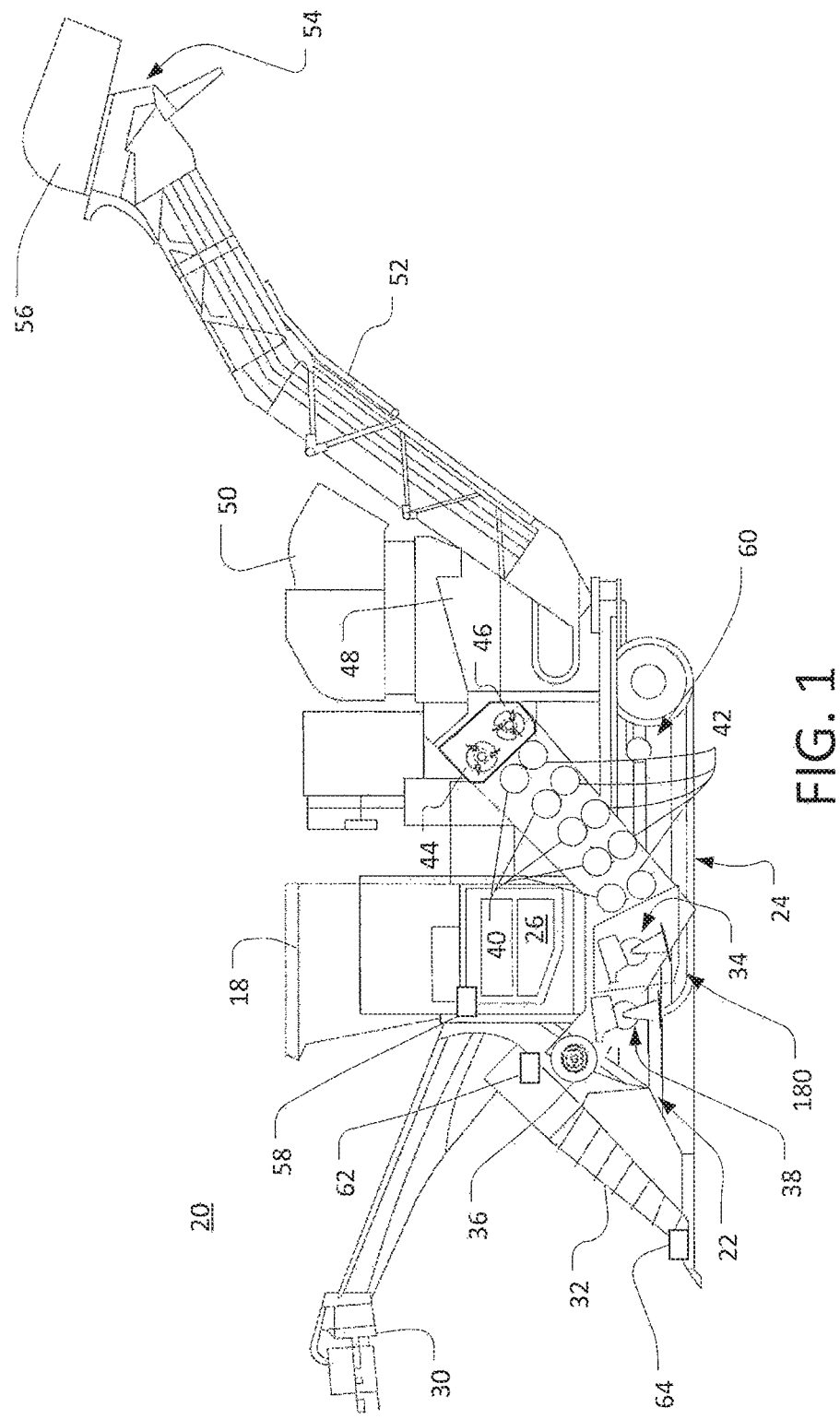
FIG. 1 is a side view of an example sugarcane harvester with modular assembly.

The following describes one or more example embodiments of the disclosed modular assembly for sugarcane harvesters, as shown in the accompanying figures of the drawings described briefly above. Various modifications to the example embodiments may be contemplated by one of skill in the art.

As noted above, it may be useful to configure a particular sugarcane harvester differently, depending on the characteristics of the field and sugarcane to be harvested, as well as other factors. Existing systems for adjusting sugarcane harvester configuration, however, may lack stability or rigidity, and may allow adjustment of only a limited number of harvesting devices (e.g., only a set of crop dividers, only a knockdown roller, and so on). Further, existing systems may not facilitate the mounting and configuration of various combinations of multiple harvesting devices for a particular harvester chassis.

The disclosed modular assembly may address these and other issues. A modular assembly may allow for customizable configuration of a variety of harvesting devices for a particular sugarcane harvester, depending on current harvesting needs. A modular assembly may also allow an operator to readily substitute certain harvesting devices for others, for a particular harvester, in order to better configure the harvester for a particular field.

In certain embodiments, a chassis of a harvester may be outfitted with a number of mounting locations (e.g., a number of precisely located bolt holes). A crop divider support module may be attached to the chassis at various of the mounting locations, such that, depending upon the mounting location utilized, the support module may support a crop divider, with respect to the chassis, in a variety of orientations. In certain embodiments, crop divider support modules may be mounted on either side of the front of a chassis, in order to separately support a pair of crop dividers at a particular configuration (e.g., a particular spacing) suitable to a particular field (e.g., with particular row spacing).

In certain embodiments, a base cutter support module may also be mounted to various mounting locations on a harvester chassis. In this way, a base cutter assembly may also be supported in a variety of orientations with respect to the chassis. In certain embodiments, mounting locations for a crop divider support module may also be utilized for a base cutter support module. For example, a crop divider support module may be aligned with a chassis at one set of mounting locations. A base cutter support module (e.g., a front base cutter support module) may then also be aligned with the chassis at the one set of mounting locations (or a portion thereof), and both of the support modules mounted the chassis with a common connection (e.g., shared bolts attached to a shared mounting locations)

In certain embodiments, the chassis may define a module cavity (e.g., a space generally between a particular set of chassis beams or supports), within which a variety of harvesting (or other) modules may be interchangeably mounted. For example, another base cutter support module (e.g., rear base cutter support module) and a feed roller support module may both be provided. The two modules may be configured to mount to the chassis (e.g., using the same mounting locations) such that a rear base cutter or a set of feed rollers, respectively, are oriented within the module cavity. As such, depending upon which of the modules is selected, a harvester may be readily equipped with either a second (or other) base cutter or an additional set of feed rollers.

In certain embodiments, a transport frame (e.g., an axle assembly, a track carriage, and so on) may be provided in order to support a transport mechanism (e.g., various wheels, tracks, and so on) for a harvester while also allowing customizable configuration of the orientation of the transport mechanism. For example, a set of tracks may be supported by a track frame (or carriage), which may itself be attached to a chassis of a harvester. Various devices may be utilized to adjust the orientation of the set of tracks with respect to the harvester. For example, tracks on either side of the harvester may be moved laterally (or otherwise) on a supporting track frame to vary the spacing between the tracks, or a separate track frame on each side of the harvester may be moved laterally (or otherwise) with respect to the chassis to the same effect.

As will become apparent from the discussion herein, the disclosed modular assembly may be used advantageously in a variety of settings and with a variety of machinery. In certain embodiments, referring now to FIG. 1, the disclosed system and method may be implemented with regard to a sugarcane harvester 20. It will be understood, however, that the disclosed system and method may be used for various other vehicles or non-vehicle platforms, including various sugarcane harvesters of different configurations or designs than the sugarcane harvester 20 of FIG. 1.

The harvester 20 is presented in a side view in FIG. 1, with the front of the harvester 20 facing to the left. Accordingly, certain right-side components of the harvester 20 are not be visible in FIG. 1. The harvester 20 may include a cab 18 to seat an operator, as well as a chassis 22, supporting various cutting, routing and processing devices. In certain embodiments, the chassis 22 may be supported by a transport frame such as track frame 60 supporting track assemblies 24. Other harvesters may include wheels supported by axle assemblies (not shown). An engine 26 may supply power for driving the harvester along a field and for powering various driven components of the harvester 20. In certain embodiments, the engine 26 may directly power a main hydraulic pump (not shown). Various driven components of the harvester 20 may be powered by hydraulic motors (not shown) receiving hydraulic power from the main hydraulic pump via one or more hydraulic loops (not shown).

A cane topper 30 may extend forward of the chassis 22 in order to remove the leafy tops of sugarcane plants (not shown), and a set of rotary crop dividers (e.g., left-side divider 32 shown in FIG. 1) may guide the remainder of the sugarcane toward internal mechanisms of the harvester 20 for processing. As the harvester 20 moves across a field, plants passing between the crop dividers 32 may be deflected downward by a knockdown roller 36 before being cut near the base of the plants by one of base cutters 34 and 38. The crop dividers 32 and the base cutters 34 and 38 may be supported by the chassis 22 in various ways.

Rotating disks, guides, or paddles (not shown) on the front base cutter 38 and the rear base cutter 34 may further direct the cut ends of the plants upwardly and rearward within the harvester 20 into a feed train for further transport and processing. For example, sugarcane cut by one of the base cutters 34 or 38 may be passed by the base cutters 34 or 38 toward successive pairs of upper and lower feed rollers 40 and 42 supported by the chassis 22. The feed rollers 40 and 42 may then rotate in order to convey the stalks toward chopper drums 44 and 46 for chopping into relatively uniform billets. In certain embodiments, the feed rollers 40 and 42 may be included in a hydraulic circuit such that the feed rollers 40 and 42 may be rotatably driven by a hydraulic motor or other device (not shown).

The chopper drums 44 and 46 may rotate in opposite directions, with respect to each other, in order to chop the passing stalks into billets and propel the billets into a cleaning chamber 48 at the base of a primary extractor 50. The primary extractor 50 may utilize a powered fan to extract trash and debris from the cleaning chamber 48, while allowing the billets of sugarcane stalks to drop onto a loading elevator 52 with a forward end located at the bottom of the cleaning zone 48. The loading elevator 52 may then convey the cleaned billets upward to a discharge location 54, below a secondary extractor 56, where the billets may be discharged into a trailing truck or other receptacle (not shown).

As also noted above, various devices within the harvester 20 may be driven via hydraulic (or other) motors that are indirectly powered by the engine 26. For example, rotation of the cutting blades of the base cutter 34 may be driven by one or more hydraulic motors (not shown) on a closed-loop base cutter hydraulic circuit (not shown), which may in turn be powered by the main hydraulic pump (not shown) driven by the engine 26. The hydraulic circuit for the base cutter 34 may be distinct from the hydraulic circuit for other harvesting devices (e.g., the feed rollers 40 and 42 or other devices).

As another example, rotation of the chopper drums 44 and 46 may be driven by one or more hydraulic motors (not shown) on a closed-loop chopper drum hydraulic circuit (not shown), which may in turn be powered by the man hydraulic pump (not shown) driven by the engine 26. The hydraulic circuit for the chopper drums 44 and 46 may be distinct from the hydraulic circuit for other harvesting devices (e.g., the feed rollers 40 and 42, the base cutter 34, or other devices).

In certain embodiments, various sensors and related devices may be utilized. For example, one or more position (or height) sensors 62 and 64 may be oriented at or near the crop dividers 32 in order to assist in tracking the orientation of the crop divider 32 with respect to the ground or to the chassis 22 of the harvester 20. The sensors 62 and 64 may be configured in various ways and may be in communication with various other devices associated with the harvester 20. Separate sensors 62 or 64 may be utilized to separately track the orientation of separate (e.g., right and left) crop dividers 32. In certain embodiments, various other sensors and sensor types may additionally (or alternatively) be utilized.

In certain embodiments, one or more control devices, such as controller 58, may be included in (or otherwise associated with) the harvester 20. The controller 58, for example, may include one or more computing devices including various processor devices and various associated memory architectures. In certain embodiments, the controller 58 may additionally (or alternatively) include various other control devices such as various electro-hydraulic valves and hydraulic circuits, various electronic control circuits and devices (e.g., various power electronics devices), and so on. In certain embodiments, the controller 58 (or another control device) may be in communication with various switches, controls and other interfaces or input devices (not shown) in the cab 18, as well as with various sensors, actuators, or other devices (not shown in FIG. 1) distributed throughout the harvester 20. For example, the controller 58 may be in communication with the position sensors 62 and 64, wheel speed sensors (not shown), engine speed sensors (not shown), and so on. In certain embodiments, the controller 58 (or another control device) may be a remotely located from the harvester 20 and may communicate with various devices and systems of the harvester 20 via wireless or other communication means.

Figure 2:
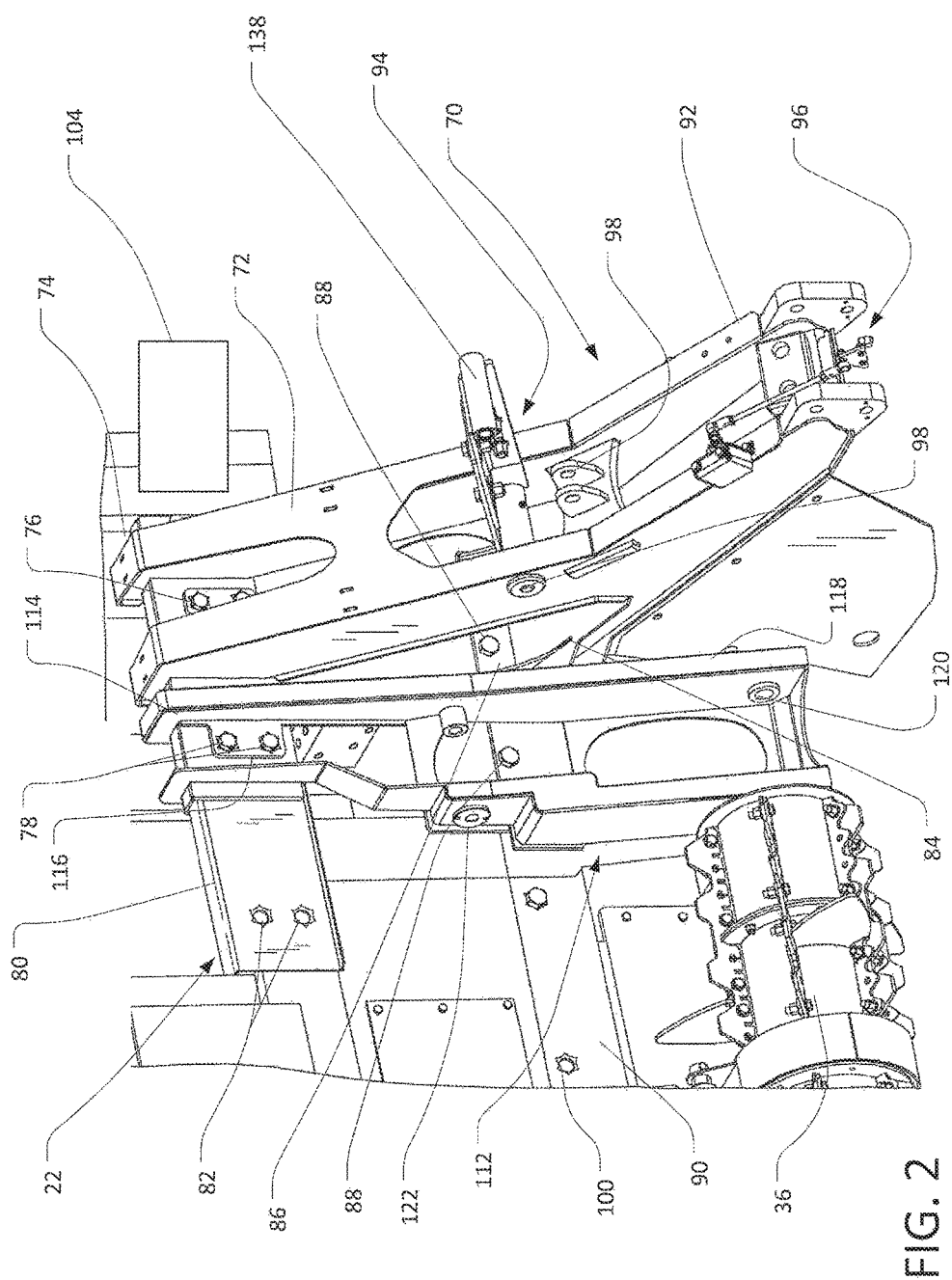
FIG. 2 is a partial perspective view showing support modules attached to a chassis of the harvester of FIG. 1.

The crop dividers 32 may be supported with respect to the chassis in a number of ways. In certain embodiments, the crop dividers 32 may be supported on removable modules, such that the orientation of the crop dividers 32 with respect to the chassis 22 may be easily configurable. Referring also to FIG. 2, various mounting structures may be attached to (or formed as part of) the chassis 22 in order to provide a variety of mounting locations for the crop dividers 32. For example, an upper mounting structure 80 and a lower mounting structure 90, each constructed of formed and welded metal plates, may be bolted or welded to the chassis 22. A variety of sleeves 82 and 100 may extend through the mounting structures 80 and 90, the sleeves 82 and 100 (or others) being configured to receive various bolts 76, 78, and 88 (or other attachment devices). Other devices for mounting components to the mounting structures 80 and 90 may additionally (or alternatively) be utilized, including various clips, latches, hooks, bolt holes, and so on. The locations of the sleeves 82 and 100 along the structures 80 and 90 (or the locations of other mounting devices) may be viewed as "mounting locations." As can be seen from the location of the various bolts 76, 78 and 88 and sleeves 82 and 100 in FIG. 2, the various mounting locations for the mounting structures 80 and 90 may be spaced laterally apart from each other. The sleeves 82 and 100 (or other mounting devices) may accordingly provide for a relatively rigid connection between various support modules (as discussed below) and the chassis 22, in each of various possible configurations.

As depicted in the various figures, the mounting structures 80 and 90 may extend laterally across the full width of the chassis 22. In certain embodiments, it may be appropriate to include mounting structures that do not extend across the full width of the chassis 22. For example separate right- and left-side mounting structures (not shown) may be utilized.

One or more crop divider support modules 70 (e.g., one module 70 for each side of the harvester 20) may be utilized to in order to support the crop dividers 32 in a configurable manner. The support modules 70 may be attached to the mounting structures 80 and 90 at various of the different mounting locations, depending on the desired orientation of the modules 70. In this way, the support modules 70 may be supported at various discreet and laterally separated orientations with respect to the chassis 22. In certain embodiments, the support modules 70 may be attached to the mounting structures 80 and 90 by way of various bolts 76, 78 and 88 secured through a particular set of sleeves 82 and 100, which may correspond to a particular orientation of the modules 70. This may be useful, for example, in order to harvest sugarcane fields with different row spacings and in various other settings. This may also improve durability and reliability of the modular system.

In the embodiment depicted, the support modules 70 may be attached to the chassis 22 using laterally outer mounting locations for wider row spacing (e.g., 1.5 m rows) and may be attached to the chassis 22 using laterally inner mounting locations for narrower rows (e.g., 0.9 m rows). Other spacings and mounting locations may also be possible.

In certain embodiments, support module 70 may exhibit a generally y-shaped profile, with an upper mounting arm 72, a lower mounting arm 84, and a support arm 92 connected to the two mounting arms 72 and 84. Various known techniques (e.g., I-beam profiles, cross-supports, and so on) may be used to provide suitable strength and rigidity to the various arms 72, 84, and 92, and to the support module 70 as a whole. The upper mounting arm 72 may include, at an upper end, a mounting bracket 74, or a similar attachment structure or mechanism. In the embodiment depicted, referring also to FIG. 3A, the mounting bracket 74 may include a hooked portion, which may seat on an upper tab 80a of the mounting structure 80 when the support module 70 is attached to the chassis 22. In order to attach the upper mounting arm 72 to the mounting structure 80, with the mounting bracket 74 appropriately aligned with the mounting structure 80, various bolts 76 and 78 may be secured through various sleeves 82.

Figure 3B:
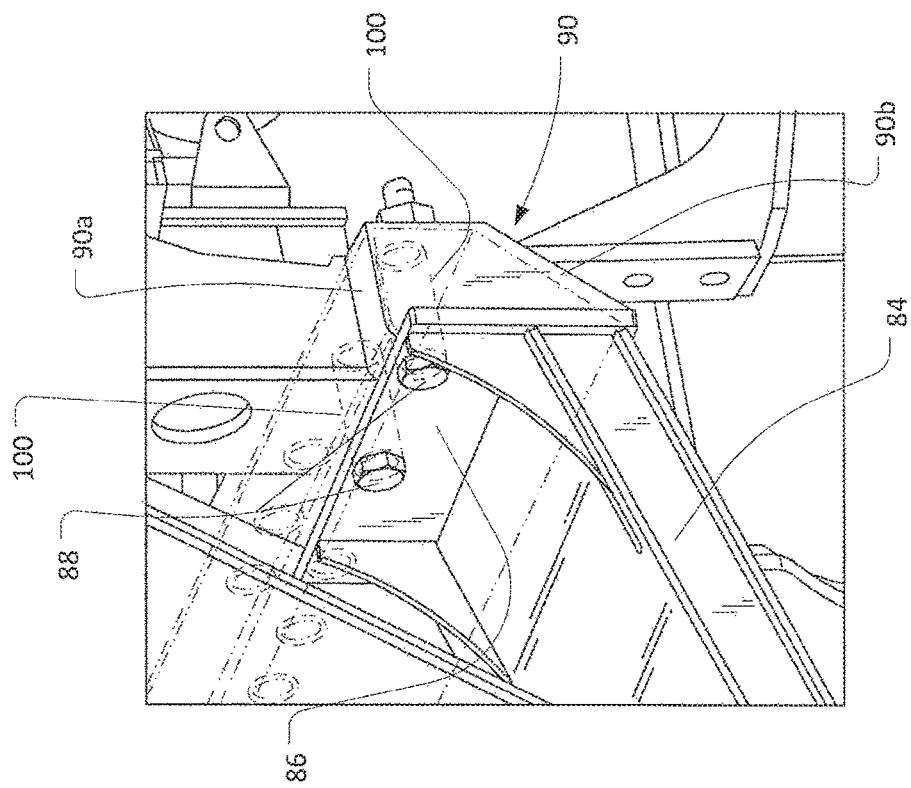
FIGS. 3A and 3B are enlarged partial perspective views of the attachment of a first support module of FIG. 2 to the chassis.
Figure 3A:
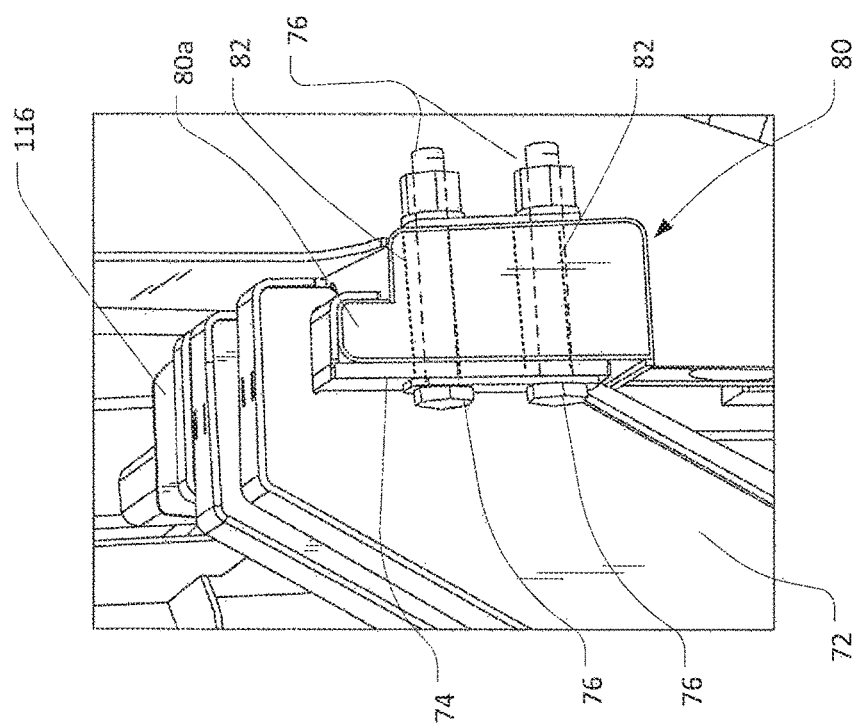

Referring also to FIG. 3B, the lower mounting arm 84 may include, at an upper or rearward end, a mounting bracket 86 or a similar attachment structure or mechanism. In the embodiment depicted, the mounting bracket 86 may be configured to seat against a forward portion of the mounting structure 90. Various bolts 88 may then be secured through various sleeves 100, in order to attach the lower mounting arm 84 to the mounting structure 90.

In order to mount the support module 70 to the chassis 22 of the harvester 20 in a variety of configurations, an operator may lift the support module 70 to seat the upper mounting bracket 74 on the upper mounting structure 80. This may cause the natural moment of the support module 70 to urge the lower mounting bracket 86 against the lower mounting structure 90. The operator may then align the support module 70 with the appropriate set of mounting locations and secure the module 70 to the both of the mounting structures 80 and 90. As noted above, in this way an operator may configure various support modules 70 (e.g., each of left- and right-side support modules 70) to support the associated crop dividers 32 in various orientations.

Figure 4:
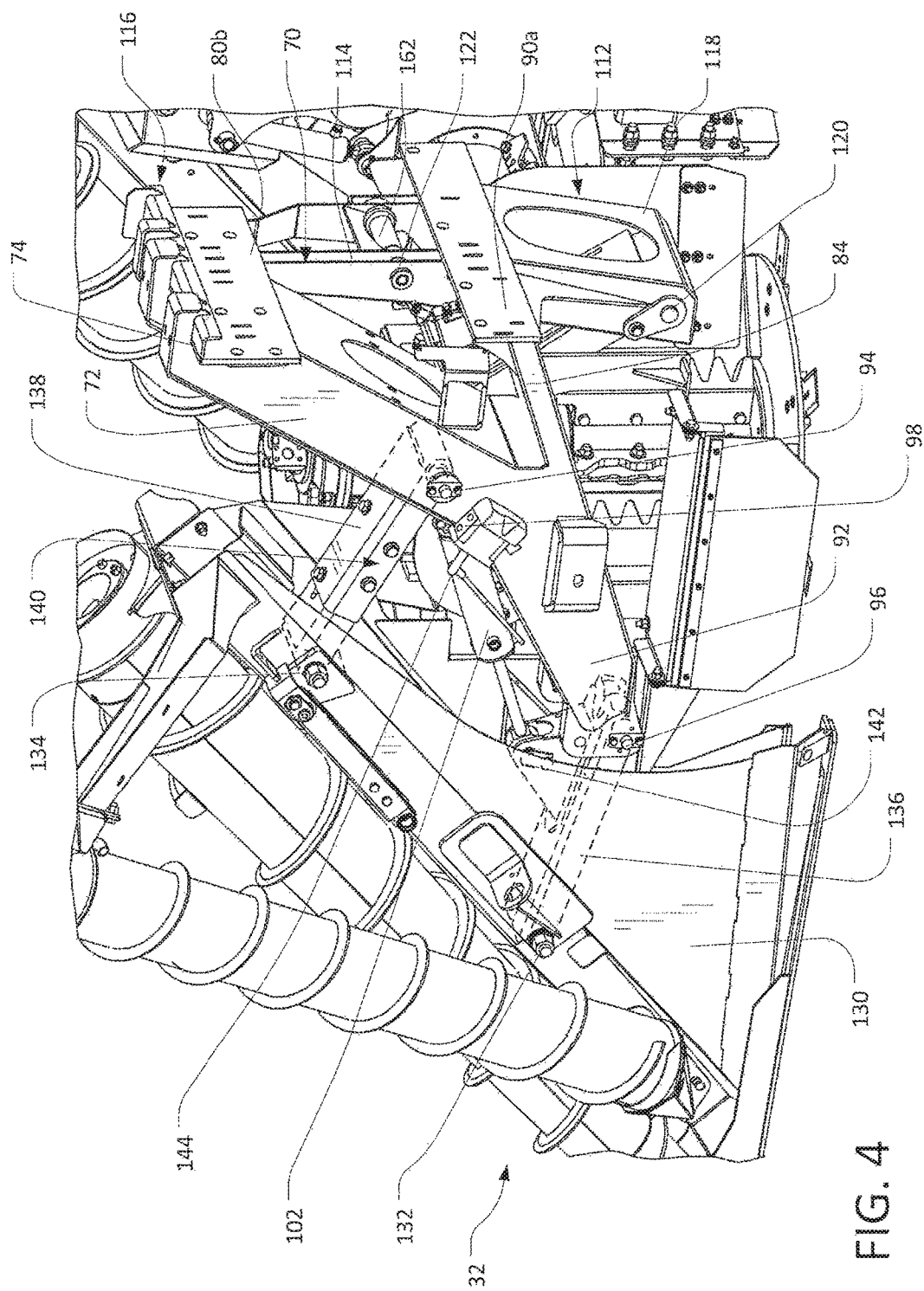
FIG. 4 is a partial perspective view of a crop divider and crop divider support attached to the first support module of FIG. 2.

The crop dividers 32 may be supported by the support modules 70 in various ways. In certain embodiments, referring also to FIG. 4, the crop dividers 32 may be configured to move with respect to the support modules 70 and the chassis 22. In the embodiment depicted, the crop divider 32 may be supported with respect to the support module 70 by a four-bar linkage assembly. Each support module 70, for example, may include pivot mounts 94 and 96, for indirect (or direct) attachment of the crop dividers 32. Various links 136 and 138 may be mounted to the pivot mounts 94 and 96, as well as to pivot mounts 132 and 134 on a frame 130 for the associated crop divider 32. In certain embodiments, the length of one or more of the links 136 and 138 may be adjustable in order to adjust the range of movement of the crop divider frame 130 (and the crop divider 32) with respect to the support module 70 and the chassis 22. For example, the link 138 may include a slot and bolt assembly 140, by which the length of the link 138 may be adjusted. It will be understood that various other support arrangements (e.g., lever arrangements, other linkages, and so on) may be utilized.

In certain embodiments, a ground-tracking assembly for the crop dividers 32 may help to maintaining appropriate contact between the crop dividers 32 and the ground of a particular field. For example, a hydraulic (or other) system may be provided in order to actuate or otherwise control movement of the crop dividers 32 in response to the contours of the ground. In the embodiment depicted, an actuator mount 142 may be provided on the link 136, and a corresponding actuator mount 98 may be provided on the support module 70. An actuator (e.g., hydraulic actuator 102) may be attached to each of the mounts 142 and 98, such that extension or retraction of the cylinder of the actuator 102 may move the crop divider frame 130 along a path defined by the links 136 and 138.

In certain embodiments, various control strategies may be utilized for a ground-tracking assembly. For example, a target pressure (or pressure range) may be determined for the hydraulic actuator 102, which may correspond to an appropriate pressure (or range of pressures) on the ground. A pressure transducer (not shown) may be utilized to monitor the actual pressure on the actuator 102, which may vary depending on the force of contact between the crop dividers 32 and the ground. If changes in terrain (e.g., rises or ridges in the field) urge the crop divider 32 upward such that the system pressures exceed the target pressure (or pressure range), a pump (not shown) may be activated to move the crop divider 32 (e.g., upward) until the system returns to the target pressure (or range). This may help to ensure that there is appropriate force applied between the ground and the crop divider 32, such that the crop divider 32 neither digs too deeply into the soil nor bounces excessively along the ground. In certain implementations, a look-up table or similar resource or process may be utilized to determine an appropriate target pressure setting based upon the current position of the crop divider 32. For example, a current target pressure may be automatically adjusted whenever the crop divider 32 is re-oriented with the actuator 102 and the links 136 and 138 (e.g., as discussed in greater detail below).

In certain embodiments, a position sensor 144 (e.g., a linear, rotary or other sensor) may be utilized to monitor the relative orientation of the crop divider frame 130 and the crop divider 32, with respect to the crop divider support module 70 and the chassis 22. For example, the position sensor 144 may be attached (not shown) to the lower link 136 in order to detect the relative orientation of the link 136. This information may be provided to a controller (e.g., the controller 58) in order to calculate a current orientation of the crop divider 32 and frame 130 with respect to the chassis 22, the module 70, or the ground.

As noted above, the support module 70 may be supported on the mounting structures 80 and 90 in a number of discreet and laterally separated positions. In certain embodiments, various actuators may be provided to assist in moving the support module 70 (and other modules) between these positions. For example, referring again to FIG. 2, an actuator 104 may be provided. In order to appropriately configure the harvester 20, the actuator 104 may be utilized to move the support module 70 laterally along the upper and lower mounting structures 80 and 90 between various mounting locations. Once aligned with an appropriate mounting location by the actuator 104, the module 70 may then be rigidly secured to the mounting structures 80 and 90 (e.g., via the various bolts 76, 78, and 88 and sleeves 82 and 100). In this way, for example, the actuators 104 may be used to assist in alignment of the support modules 70, but the benefits of discreet, rigid mounting connections may be retained.

Still referring to FIG. 2, in order to support various front base cutters 38 in a configurable manner, one or more base cutter support modules 112 (e.g., one module 112 for each side of the harvester 20) may be provided. Like the crop divider support modules 70, the base cutter support modules 112 may be attached to the chassis at various of the different mounting locations (e.g., through various bolts 76, 78 and 88 secured through various sleeves 82 and 100). In this way, the support modules 112 may be supported at various different discreet and laterally separated orientations with respect to the chassis 22.

In certain embodiments, support module 112 may exhibit a generally extended profile, with a mounting arm 114 extending upward away from a lower support structure 118. A mounting bracket 116 (or similar attachment structure or mechanism) may be attached at the upper end of the mounting arm 114. The mounting bracket 116 may be aligned with appropriate mounting locations on the upper mounting structure 80, and various bolts 78 inserted through various sleeves 82, in order to secure the mounting arm 114 to the mounting structure 80. The support module 112 may be similarly secured to the lower mounting structure 90.

In certain embodiments, the base cutter support module 112 may be configured to attach to the chassis at the same set (or a shared subset) of mounting locations as the crop divider support module 70. As depicted in FIG. 1, for example, the mounting bracket 116 of the support module 112 may be configured to seat on the mounting bracket 74 of the support module 70, such when the two modules 70 and 112 are bolted to the mounting structure 80, the support module 112 is supported by the chassis 22 via the support module 70. In such a configuration, it may be possible to configure the harvester 20 to include or not include the front base cutter 38, as appropriate. For example, the crop divider support module 70 may be located on the mounting structures 80 and 90 at the appropriate mounting locations to provide an chosen orientation (or range of orientations) of the crop dividers 32. As needed, the base cutter support module 112 may be seated on the crop divider support module 70, and the two support modules 112 and 70 rigidly secured to the chassis.

Figure 5:
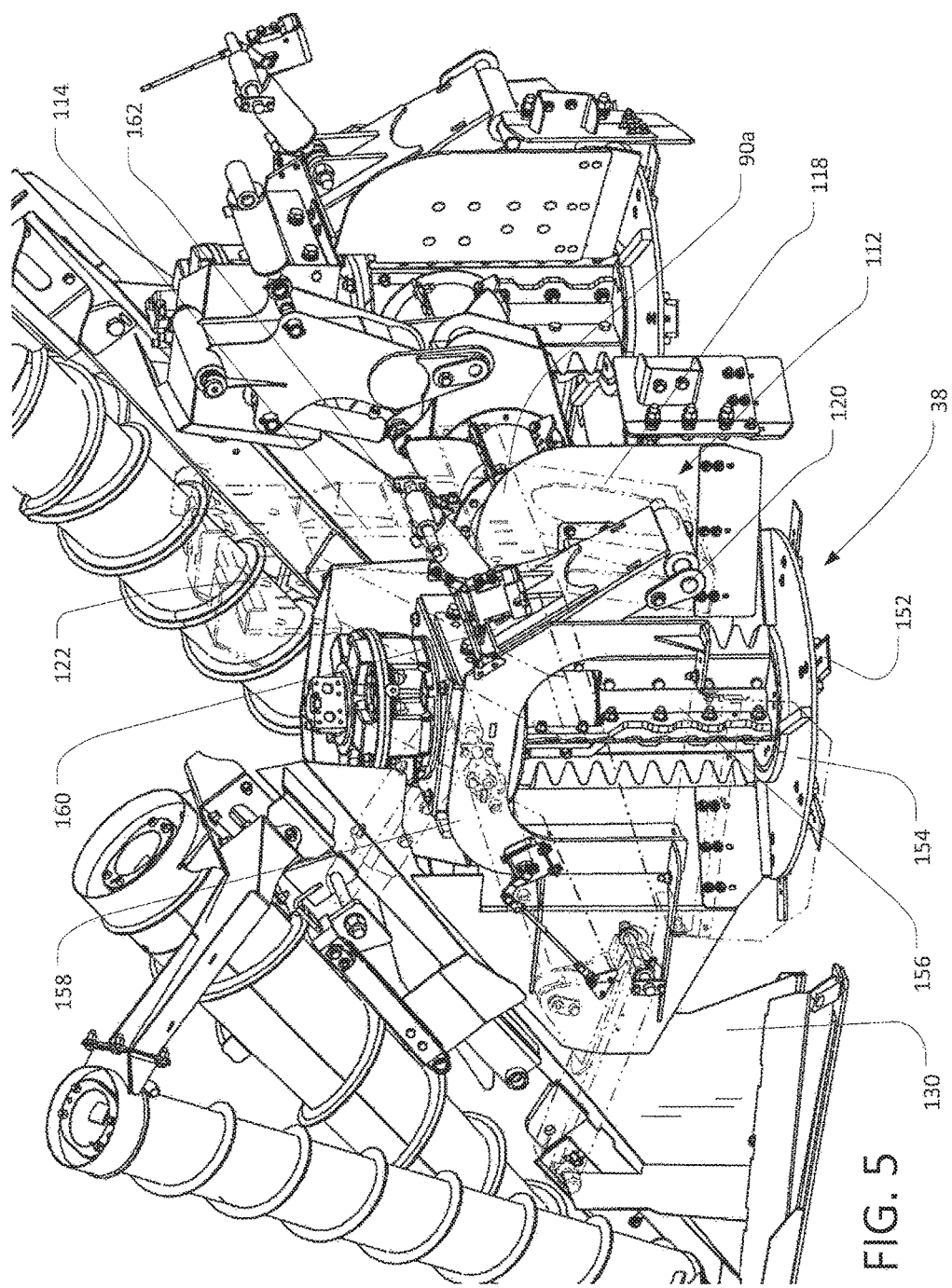
FIG. 5 is a partial perspective view of a base cutter and support arm attached to a second support module of FIG. 2.

Referring also to FIG. 5, the front base cutters 38 may be supported by the support modules 112 in various ways. (For clarity of presentation, various features are represented with phantom lines in FIG. 5.) In certain embodiments, the base cutters 38 may be configured to move with respect to the support modules 112. In the embodiment depicted, each support module 112 may be configured to include pivot mounts 120, for indirect (or direct) attachment of the base cutters 38. A support arm 158 (or other apparatus) may be pivotally mounted to the pivot mounts 120 of the support module 112 at one end of the support arm 158, and may rigidly support one of the base cutters 38 at the other end of the support arm 158. The support arm 158 may pivot about the pivot mounts 120 in order to pivot the base cutter 38 with respect to the chassis 22. It will be understood that various other support arrangements may be utilized, including various slide assemblies, rail and roller assemblies, linear actuators, four-bar and other linkage arrangements, other levers or arms, and so on.

In certain embodiments, a hydraulic (or other) system may be provided in order to actuate or otherwise control movement of the base cutters 38. For example an actuator mount 160 may be provided on the base cutter 38 (e.g., on a support frame (not shown) of the base cutter 38), and a corresponding actuator mount 98 may be provided on the support module 112. A hydraulic (or other) actuator 162 may be attached to each of the mounts 160 and 122, such that extension or retraction of the cylinder of the actuator 162 may move the base cutter 38 along a path defined by the support arm 158. Accordingly, the relative orientation of the base cutter 38 with respect to the ground and the chassis 22 may be adjusted. Correspondingly, movement of the support arm 158 may also adjust the relative angle of various base cutter components, including base cutter blades 152, disk 154, spindle 156, and so on.

Other modules (and combinations of modules) may also be utilized. Referring also to FIGS. 6A and 6B, the harvester 20 may include a set of rear base cutters 34 as well as the set of front base cutters 38. The rear base cutters 34 may be rigidly mounted to the chassis 22 in one of a number predetermined configurations (e.g., with the blades of the base cutters 34 oriented at one of a limited number of different cutting angles with respect to ground), and may not necessarily be adjustable with respect to the chassis during operation of the harvester 20. In certain embodiments, however, the relative orientation the chassis 22 itself may be adjusted, with respect to the ground, during harvester operation. For example, various actuators (not shown) may be utilized to pivot (or otherwise move) the chassis 22 with respect to the track frames 60 and thereby to pivot (or otherwise move) the chassis 22 with respect to the ground. Because the base cutters 34 may be rigidly mounted to the chassis 22, this adjustment of the chassis 22 may also change the orientation of the base cutters 34, with respect to the ground. Further, because the base cutters 38 may be mounted to the chassis via the support modules 112, adjustment of the chassis 22 may also change the orientation of the base cutters 38.

In certain embodiments, it may be useful to provide two sets of base cutters 34 and 38. In other instances, however, only one set of base cutters (e.g., front base cutters 38) may be necessary. When one set of base cutters (e.g., rear base cutters 34) is not needed, it may be useful to utilize other harvesting devices in its place. For example, for certain row spacings of sugarcane, the rear base cutters 34 may tend to serve only to pick up sugarcane already cut by the front base cutters 38 and to route the cut sugarcane further back into the feed train of the harvester 20. Among other issues, this use of the rear base cutters 34 may increase the likelihood of losses due to double cuts of the sugarcane. Accordingly, it may be useful to substitute a different harvesting device (e.g., a set of feed rollers) for the base cutters 34.

In certain embodiments, the disclosed modular assembly may facilitate this substitution (and others). A module cavity may be a space defined, at least in part, by the chassis 22 within which a harvesting device may be oriented and need not include a fully enclosed space, complete top and bottom walls, or a particular configuration of supports. By including a module cavity in the chassis 22, along with corresponding mounting locations, space may be provided for relatively simple interchange of various harvesting devices, depending on current harvesting needs.

In the embodiment depicted, for example, the chassis 22 may be configured to include a module cavity 180 that is located generally behind the front base cutters 38 (e.g., behind and below the upper and lower mounting structures 80 and 90 (see FIGS. 1 and 2). The module cavity 180 may be viewed as a generally open space between various structures (e.g., various support beams, tubes and so on) of the chassis 22. As depicted, the module cavity 180 may be generally between the front base cutters 38 and the initial feed rollers 40 and 42 of the feed train (see FIG. 1). Different support modules for various harvesting device (or "harvesting device support modules") may be configured to mount to the chassis 22, such that associated harvesting devices may be oriented within the module cavity 180. In this way, various different harvesting devices may operate within the module cavity 180, depending upon which harvesting device module is currently mounted to the chassis 22.

Various types of harvesting device support modules may be provided. As depicted in FIG. 6A, a rear base cutter support module 170 may include a support structure 172 supporting the rear base cutters 34. The support structure 172 may be configured such that the base cutters 34 are generally oriented within the module cavity 180 when the support structure 172 is mounted to the chassis 22. As depicted in FIG. 6B, a feed roller support module 174 may include a support structure 176 supporting various feed rollers 178. The support structure 176 may be configured such that the feed rollers 178 are generally oriented within the module cavity 180 when the support structure 176 is mounted to the chassis 22. In certain embodiments, the chassis 22, the module cavity 180, and the various related harvesting device modules (e.g., modules 170 and 174) may be configured such when the various modules are mounted to the chassis 22 the associated harvesting devices are aligned to pass sugarcane material to downstream components of the feed train (e.g., feed rollers 40 and 42, as depicted in FIG. 1).

When the rear base cutters 34 are needed (e.g., as may depend on field conditions or layout, the sugarcane itself, the configuration of the front support modules 70 and 112, and so on), the support module 170 may be attached to the chassis 22 such that the rear base cutters 34 are oriented within the module cavity 180. The harvester 20 may then be operated with the base cutters 34 being utilized to cut sugarcane from the ground, to route already-cut sugarcane from the base cutters 38 farther into the harvester 20, and so on. When the rear base cutters 34 are not needed, however, or when other harvesting devices may be more useful, the support module 170 may be detached from the chassis 22 and a different harvesting device support module installed. For example, the base cutter support module 170 may be removed and the feed roller support module 174 attached in its place (e.g., using the same mounting locations on the chassis 22). The harvester 20 may then be operated with the feed rollers 178 serving to route cut sugarcane farther into the harvester 20.

Other modularity and configurations are also possible. In certain embodiments, it may be possible to move the tracks 24 (or wheels (not shown)) with respect to the chassis 22 (or vice versa) to further customize the harvester 20 to a particular set of operations. This may be useful, for example, in order to vary the lateral spacing between various left- and right-side tracks 24 (or wheels, and so on). As depicted in FIGS. 6A and 6B, various actuators 184 may be mounted to the chassis 22 and to the track frame 60 (or other relevant structure). The actuators 184 may be utilized to vary the distance between the right- and left-side tracks 24, as appropriate. In certain embodiments, separate right- and left-side track carriages (not shown) may support the tracks 24 with respect to a single track frame 60, and the actuators 184 may be utilized to move each of the track carriages laterally along a single track frame 60. In certain embodiments, the track frame 60 may be separated into separate right- and left-side frames (not shown), each supporting an associated track 24. In such a case, the actuators 184 may move each of the separate side frames with respect to the chassis 22.

In light of the discussion above, it will be understood that the various support modules may be utilized in various combinations in order to optimally configure the harvester 20 for a variety of field and crop arrangements. For example, through selective use and arrangement of the support modules 70, 112, 170 and 174 (and others), appropriate spacing for the crop dividers 32 may be obtained, as well as appropriate orientations and combinations of various base cutters 38 and 34, feed rollers 178, and other devices.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A modular, adjustable sugarcane harvester, comprising:
   a chassis having a first plurality of discreet and laterally separated mounting locations and a second plurality of discreet and laterally separated mounting locations;
   a crop divider;
   a front base cutter assembly;
   a crop divider support module configured to separately and fixedly attach to the chassis at each of the first plurality of mounting locations, the crop divider support module thereby separately supporting the crop divider in, respectively, each of a plurality of discreet and laterally separated crop divider orientations; and
   a front base cutter support module configured to separately and fixedly attach to the chassis at each of the second plurality of mounting locations, the front base cutter support module thereby separately supporting the front base cutter assembly in, respectively, each of a plurality of discreet and laterally separated front base cutter orientations;
   wherein the crop divider support module is distinct from the front base cutter support module, the crop divider support module and the front base cutter support module being separately attachable to the chassis.

2. The sugarcane harvester of claim 1, further comprising:
   one or more actuators attached to the crop divider support module, the one or more actuators being configured to move the crop divider support module between two or more of the first plurality of mounting locations.

3. The sugarcane harvester of claim 2, wherein the crop divider support module includes an upper mounting arm mounted to the chassis, a lower mounting arm mounted to the chassis, and a support arm attached to each of the upper and lower mounting arms and to the crop divider.

4. The sugarcane harvester of claim 1, further comprising:
   one or more links extending between the crop divider support module and the crop divider;
   wherein, when the crop divider support module is attached to the chassis at one of the first plurality of mounting locations, the one or more links support the crop divider with respect to the chassis.

5. The sugarcane harvester of claim 1, further comprising:
   one or more actuators attached to one or more of the crop divider and the crop divider support module, the one or more actuators being configured to move the crop divider with respect to the chassis when the crop divider support module is attached to the chassis at one of the first plurality of mounting locations.

6. The sugarcane harvester of claim 1, wherein the first and second plurality of mounting locations include a plurality of common mounting locations; and
   wherein the front base cutter support module and the crop divider support module are configured to attach to the chassis simultaneously at a shared one or more of the plurality of common mounting locations.

7. The sugarcane harvester of claim 1, further comprising:
   one or more actuators attached to one or more of the front base cutter assembly and the front base cutter support module, the one or more actuators being configured to move the front base cutter assembly with respect to the chassis when the base cutter support module is attached to the chassis at one of the second plurality of mounting locations.

8. The sugarcane harvester of claim 1, further comprising:
a module cavity defined, at least in part, by the chassis, the module cavity being oriented behind the crop divider, with respect to a forward direction of travel of the sugarcane harvester;
at least one module cavity mounting location included on the chassis;
a feed roller support module supporting one or more feed rollers, the feed roller support module being configured to attach to the chassis at that at least one module cavity mounting location, such that the one or more feed rollers are oriented, at least in part, within the module cavity; and
a rear base cutter support module supporting a rear base cutter assembly, the rear base cutter support module being configured to attach to the chassis at the at least one module cavity mounting location, such that the rear base cutter assembly is oriented, at least in part, within the module cavity;
wherein only one of the feed roller support module and the rear base cutter support module at a time may be mounted to the chassis at the at least one module cavity mounting location.

9. The sugarcane harvester of claim 1, further comprising:
a transport frame supporting one or more of a track for moving the sugarcane harvester and a wheel for moving the sugarcane harvester; and
one or more actuators attached to the transport frame;
wherein the one or more actuators are configured to move the transport frame with respect to the chassis, in order to adjust a relative orientation of the one or more of the track and the wheel with respect to the chassis.

* * * * *

UNITED STATES PATENT AND TRADEMARK OFFICE
CERTIFICATE OF CORRECTION

PATENT NO. : 10,058,028 B2
APPLICATION NO. : 15/344020
DATED : August 28, 2018
INVENTOR(S) : Richard et al.

It is certified that error appears in the above-identified patent and that said Letters Patent is hereby corrected as shown below:

In the Claims

In Column 13, in Claim 8, Line 10, delete "at that" and insert -- at the --, therefor.

Signed and Sealed this
Eighth Day of January, 2019

Andrei Iancu
*Director of the United States Patent and Trademark Office*